Figure 1:
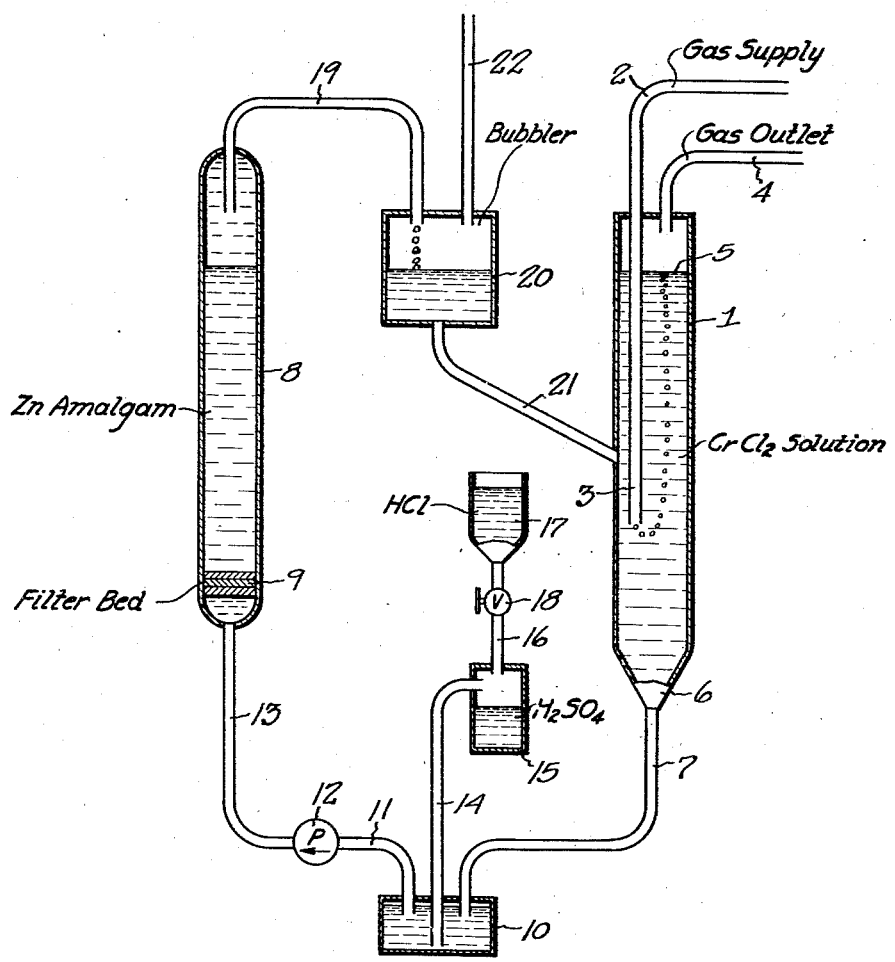

June 3, 1947.  L. KURLAND  2,421,568
METHOD FOR ABSORBING OXYGEN
Filed Oct. 6, 1944

Leonard Kurland
INVENTOR.
BY Altich & Knoblock
Attorneys.

Patented June 3, 1947

2,421,568

UNITED STATES PATENT OFFICE 2,421,568

METHOD FOR ABSORBING OXYGEN

Leonard Kurland, East Chicago, Ind., assignor to The Hays Corporation, Michigan City, Ind., a corporation of Indiana Application October 6, 1944, Serial No. 557,508

10 Claims. (Cl. 23—2)

1

This invention relates to a method and means for absorbing oxygen, and particularly to a method and means which may be used for gas analysis and other purposes.

The absorption method of gas analysis has been recognized as an accurate and reliable or standard procedure, and has been developed and widely used in commercial or industrial work as well as in laboratory work, to determine the percentages of certain gases in a gas sample. However, its use for determination of oxygen has not been generally practiced. Two principal difficulties have been encountered. One of these difficulties is that pyrogallol, usually used as the absorbing agent, reacts rather slowly and will absorb other gases such as carbon dioxide ($CO_2$) and sulphur dioxide ($SO_2$) in addition to oxygen. Consequently, to obtain a determination of oxygen in a gas sample by using pyrogallol, the sample must first be subjected to the action of other agents to remove therefrom all constituents which pyrogallol will absorb, except oxygen, and then be subjected to pyrogallol. Apparatus of such character gives a slow response, requires multiple indicating devices from whose readings the desired result must be calculated, and is subject to other objections. The other difficulty is that attempts to use a chromous chloride ($CrCl_2$) solution, which has superior absorption properties from the standpoint of fast absorption of oxygen only, have heretofore been possible and practical only in the laboratory, because of the limited absorptive capacity of the chromous chloride solution and the necessity of replacing the same after use thereof upon comparatively small quantities of gas if the absorptive properties thereof are to remain sufficiently constant for accurate results.

Therefore, it is the primary object of this invention to provide an oxygen absorption device which is simple, easy to operate, fast in operation, and by which results of uniform accuracy may be obtained.

A further object is to provide an oxygen absorber utilizing an acidic chromous chloride solution as the absorbing agent and including means to regenerate the absorbing agent at a constant rate which is at least equal to the rate at which said agent degenerates or becomes spent during the absorbing operation.

A further object is to provide an oxygen absorbing device having a bubbling pipette within which oxygen is absorbed, a reductor for regenerating the absorbing agent and a pump, all connected in a closed system, whereby a rapid, continuous

2 and complete absorption of oxygen only may be obtained.

A further object is to provide a rapid method for completely absorbing the oxygen content of a gas sample.

Other objects will be apparent from the description, drawing and appended claims.

In the drawing, the single figure is a schematic or diagrammatic illustration of the apparatus.

Referring to the drawing, which illustrates one embodiment of my invention, numeral 1 designates a sealed vertically elongated liquid container. A gas supply tube 2 passes into the container and terminates in an open ended portion 3 extending into the container to a point adjacent the bottom or lower end thereof. A gas outlet tube 4 passes through the top of the container, with its inner open end preferably terminating above the normal liquid level 5. The lower end of container 1 is preferably tapered at 6 and is connected with a downwardly extending conduit portion 7.

A reductor 8, preferably in the form of a vertically elongated chamber or container is positioned alongside container 1. Adjacent its lower end, reductor 8 is provided with a filter bed 9. Conduit 7 is bent laterally below the level of container 1 and is connected with a sealed container 10 with which it communicates. A conduit 11 is connected with container 10 and with a pump 12. A conduit 13 connects pump 12 with the bottom of the reductor 8.

A tube 14 extends from chamber 10 into communication with the upper end of a sealed chamber 15 partially filled with sulfuric acid ($H_2SO_4$) to a level below the point of connection of tube 14 with chamber 15. A tube 16 communicates with and extends upwardly from chamber 15 and is connected with a container 17 of hydrochloric acid (HCl). Tube 16 may have a valve 18 therein.

A conduit 19 communicates with the upper end of reductor 8 and extends to and communicates with a sealed separating or bubbler chamber 20 also positioned alongside chamber 1 and of lesser height whereby its lower end terminates at a level substantially above the level of the lower end of chamber 1. A conduit 21 connects the lower end of bubbler chamber 20 with an intermediate portion of chamber 1, said conduit 21 inclining downwardly from chamber 20 to chamber 1. A gas outlet conduit 22 also communicates with the upper portion of bubbler chamber 20. At least conduit 22 terminates above the level of the liquid in the bubbler chamber, which is the same level as that in container 1. Each of the conduits 4 and 22 is connected to aspirator means (not shown) whose respective suction effects are equal and which serve respectively to circulate the gas sample into and through the liquid in chamber 1 and to withdraw or liberate any hydrogen entrapped in the CrCl₂ solution as a result of the action in the reductor 8 before the solution reaches the absorption chamber 1.

All tube and conduit connections are sealed, so that a system is provided which is sealed throughout, with the exception of tubes 2, 4 and 22 and container 17.

Within the reductor 8, supported upon filter bed 9, is a regenerating agent for an acidic chromous chloride solution, such as zinc amalgam. The quantity of zinc amalgam employed fills the major portion of the elongated reductor 8, and is sufficient to convert the chromic chloride (CrCl₃) oxidation product of a chromous chloride solution to chromous chloride (CrCl₂) in one pass, where the oxidation product constitutes only a small proportion of the solution.

The filter bed is formed from any suitable material which will prevent minute particles of zinc amalgam from escaping into the conduit 13, and which will permit comparatively free flow of solution therethrough. Such a filter bed may be made by superimposing layers of materials such as pieces of glass or porcelain, glass beads, glass wool, and asbestos, packed to an extent which fulfills the requirements mentioned above.

An acidic chromous chloride (CrCl₂) solution is introduced into the system in an amount sufficient to fill container 1 and bubbling chamber 20 to the level 5, to fill the conduit system 7, 11, 13, and the reductor 8.

In the operation of the apparatus, gas containing oxygen is supplied through tube 2, being drawn therein by the aspirator action to which outlet conduit 4 is subject, and bubbles through the chromous chloride solution after exhaust thereof from submerged tube portion 3. The oxygen content of the gas is absorbed during the bubbling operation, and the gas residue is discharged through gas outlet tube 4. The operation is thus similar to that of a bubbling pipette.

The oxidation of the chromous chloride solution proceeds quite rapidly, so that the oxygen absorbing property of a given quantity thereof remains uniform for only a short period of time during continuous gas flow therethrough and then decreases quite rapidly. The chemical reactions incident to complete oxidation of chromous chloride to the chromic salt entails complex formations which have a very low reduction rate. Consequently, to maintain uniformity of the oxygen absorbing property, and to maintain a satisfactory rate of reduction or regeneration, complete oxidation of the chromous chloride solution must be avoided. This is accomplished in the instant apparatus by constantly changing the chromous chloride solution in the gas absorption chamber. Pump 12 operates continuously for this purpose. The rate at which the partially spent chromous chloride solution is pumped from chamber 1 is determined by the rate at which the chromous chloride solution is oxidized and by the rate at which the solution can flow through the zinc amalgam to achieve regeneration and through the filter bed in said reductor without disturbance thereof. This is essential to constantly maintain the quantity of chromous chloride solution in chamber 1 at level 5 to insure uniformity. The uniformity required is determined relative to the length of the path of travel of gas bubbles through the chromous chloride solution and relative to the absorbing property of the chromous chloride solution. The formation of the filter bed 9 is important in the latter connection, since flow therethrough must be at a rate equal to or faster than the rate of oxidation. At the same time, the filter bed must be constructed to prevent passage of the zinc amalgam therethrough.

The action of regeneration in the reductor may release hydrogen gas. Such gas must be discharged from the device before it can be carried to the absorption chamber 1 with the solution. The bubbling chamber 20 provides means for escape of this hydrogen from the solution and for exhaust from the system or apparatus through conduit 22.

It is essential that the chromous chloride solution remain acidic at all times, since the rate at which the solution will absorb oxygen decreases rapidly as the acid content of the solution decreases. Also, if the solution is not predominantly acid, complex chromium compounds are precipitated in the reductor 8 of a character which will coat the zinc amalgam until no reaction is obtained therefrom. Such precipitated compounds may even entail plugging of the reductor to stop liquid flow therethrough. To maintain the necessary acid predominance of the solution, it is desirable to add HCl continuously, or substantially continuously. While not essential, it is preferable to add HCl in gaseous state. This is accomplished in the instant device by feeding HCl in a regulated flow or at a regulated rate from chamber 17 to chamber 15, where it is converted to gaseous form upon contact with H₂SO₄ and is discharged through tube 14 to chamber 10, where it is mixed with the chromous chloride solution as one step in the process of regenerating said solution.

The simplicity of the method and the apparatus, the automatic maintenance of uniform absorptive properties, and the ability to completely, ripidly and selectively absorb the oxygen constituent of a gas in a single pass render the method and apparatus particularly well adapted for use in connection with continuous chemical processes.

The rate at which reduction proceeds in the device may be regulated in various ways. Thus the size of the zinc-amalgam bed and the time the solution remains in contact therewith may be regulated. Alternatively, the solution to be regenerated may be preheated before it enters reductor 8, as by the use of a preheater (not shown) interposed in conduit 13. The latter alternative may make the use of a condenser (not shown) interposed in conduit 19 for cooling purposes desirable in order to maintain the regenerated solution being fed to container 1 at a constant temperature. Achievement of uniformity of the rate of reduction may be facilitated by selection of a reductor of proper shape. In this connection, it may be found desirable in some instances to use a reductor which provides a wide and comparatively shallow bed of zinc amalgam and which is baffled or provided with other means for controlling flow in a manner to obtain maximum contact of the solution with the zinc amalgam.

If the rate of flow in the apparatus, coupled with other operating conditions, is found to entail the entrainment of particles of the zinc amalgam in the chromous chloride solution, so that said particles are discharged from the reductor 8, a fine screen (not shown) may be positioned above the zinc amalgam in said reductor or across the mouth of conduit 21 in chamber 29, to prevent delivery of the particles to the chamber 1.

I claim:

1. The method of absorbing the oxygen content of a gas sample including the steps of bubbling a gas sample through a continuously circulating acidic solution of chromous chloride in a closed system, and regenerating said solution in said system at a rate at least equal to the rate of oxidation thereof.

2. The method of absorbing the oxygen content of a gas sample including the steps of passing a gas sample in a predetermined path through an acidic chromous chloride solution, continuously circulating said solution in a closed circulating system at a rate at least equal to the rate of oxidation thereof, and regenerating said solution in said system.

3. The method of absorbing the oxygen content in a gas sample including the steps of passing a gas sample through an acidic chromous chloride solution in an absorbing chamber, and unidirectionally circulating said solution in a closed circulatory system including said chamber and a reductor in a manner to maintain a constant level of circulating solution in said chamber.

4. The method of absorbing oxygen content in a gas sample including the steps of passing a gas sample through an acidic chromous chloride solution in one chamber of a closed liquid system, passing said solution through a zinc amalgam in another chamber of said system to regenerate the same, continuously unidirectionally circulating said solution in said system at a rate at least equal to the rate of oxidation thereof while maintaining the level thereof in said first chamber at constant height, and drawing off gas entrapped in said solution before returning it to said first named chamber.

5. The method of absorbing oxygen content in a gas sample including the steps of passing a gas sample through an acidic chromous chloride solution in one chamber of a closed liquid system, passing said solution through a zinc amalgam in another chamber of said system to regenerate the same, continuously unidirectionally circulating said solution in said system at a rate at least equal to the rate of oxidation thereof while maintaining the level thereof in said first chamber at constant height, and introducing HCl into said oxidized solution at regulated rate to maintain the acid condition of said solution substantially constant.

6. The method of absorbing the oxygen content of a gas sample including the steps of bubbling a gas sample through a continuously circulating solution of chromous chloride in a closed system, regenerating said solution in said system at a rate at least equal to the rate of oxidation thereof, and introducing an acid into said solution at a rate to maintain the acid condition of said solution substantially constant.

7. The method of absorbing the oxygen content of a gas sample including the steps of bubbling a gas sample through a continuously circulating solution of chromous chloride in a closed system, regenerating said solution in said system at a rate at least equal to the rate of oxidation thereof, and introducing HCl into said solution in gaseous state to maintain the acid condition of said solution substantially constant.

8. The method of absorbing the oxygen content of a gas sample including the steps of bubbling a gas sample through a continuously circulating solution of chromous chloride in a closed system, regenerating said solution in said system at a rate at least equal to the rate of oxidation thereof, and introducing an acid into said solution at a rate to maintain the acid condition of said solution substantially constant, and drawing off gas entrapped in said regenerated solution.

9. The method of absorbing the oxygen content of a gas sample including the steps of bubbling a gas sample through a continuously circulating solution of chromous chloride in a closed system, then introducing an acid into said oxidizing solution, then regenerating said solution in said system at a rate at least equal to the rate of oxidation thereof, and then drawing off gas entrapped in said regenerated solution.

10. The method of absorbing the oxygen content of a gas sample including the steps of passing a gas sample through a chromous chloride solution in one chamber of a closed liquid system, introducing an acid into said solution at a rate to maintain the acid condition of said solution substantially constant, passing said solution through a zinc amalgam in another chamber of said system, continuously unidirectionally circulating said solution in said system, and drawing off gas entrapped in said regenerated solution before returning it to said first named chamber.

LEONARD KURLAND.

REFERENCES CITED

The following references are of record in the file of this patent:

UNITED STATES PATENTS

| Number | Name | Date |
|---|---|---|
| 1,834,016 | Bottoms | Dec. 1, 1931 |
| 2,177,068 | Hutchinson | Oct. 24, 1939 |
| 2,139,902 | Malmgren | Dec. 13, 1938 |

OTHER REFERENCES

"Laboratory Apparatus and Supplies," Eimer and Amend, New York, N. Y., 1936, page 386.